J. E. CONZELMAN.
CONCRETE CONSTRUCTION.
APPLICATION FILED APR. 14, 1910.
1,031,044.
Patented July 2, 1912.
10 SHEETS—SHEET 1.
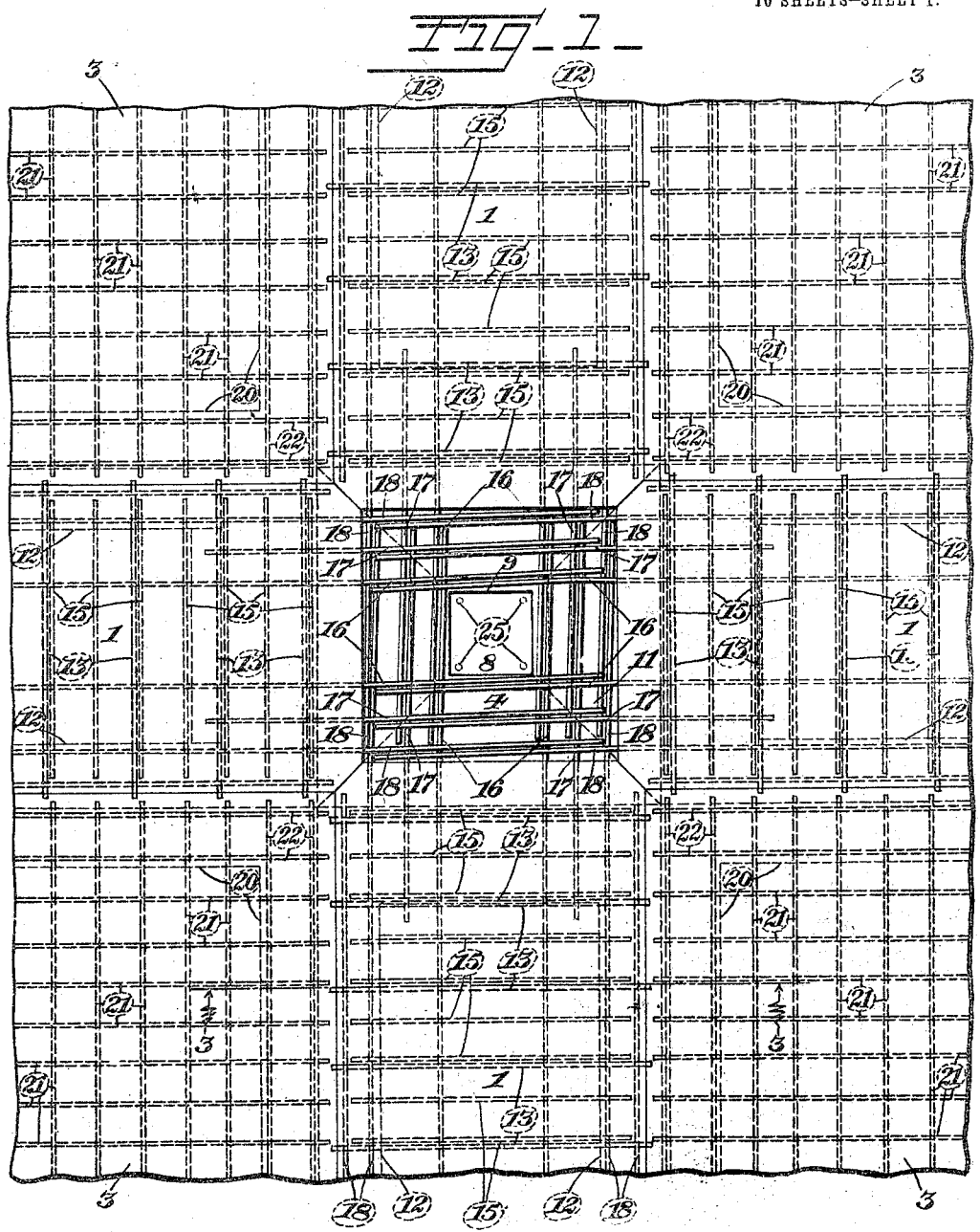
Witnesses:
Chas. A. Becker
George G. Anderson
Inventor:
John E. Conzelman
By Hugh K. Wagner,
His Attorney.

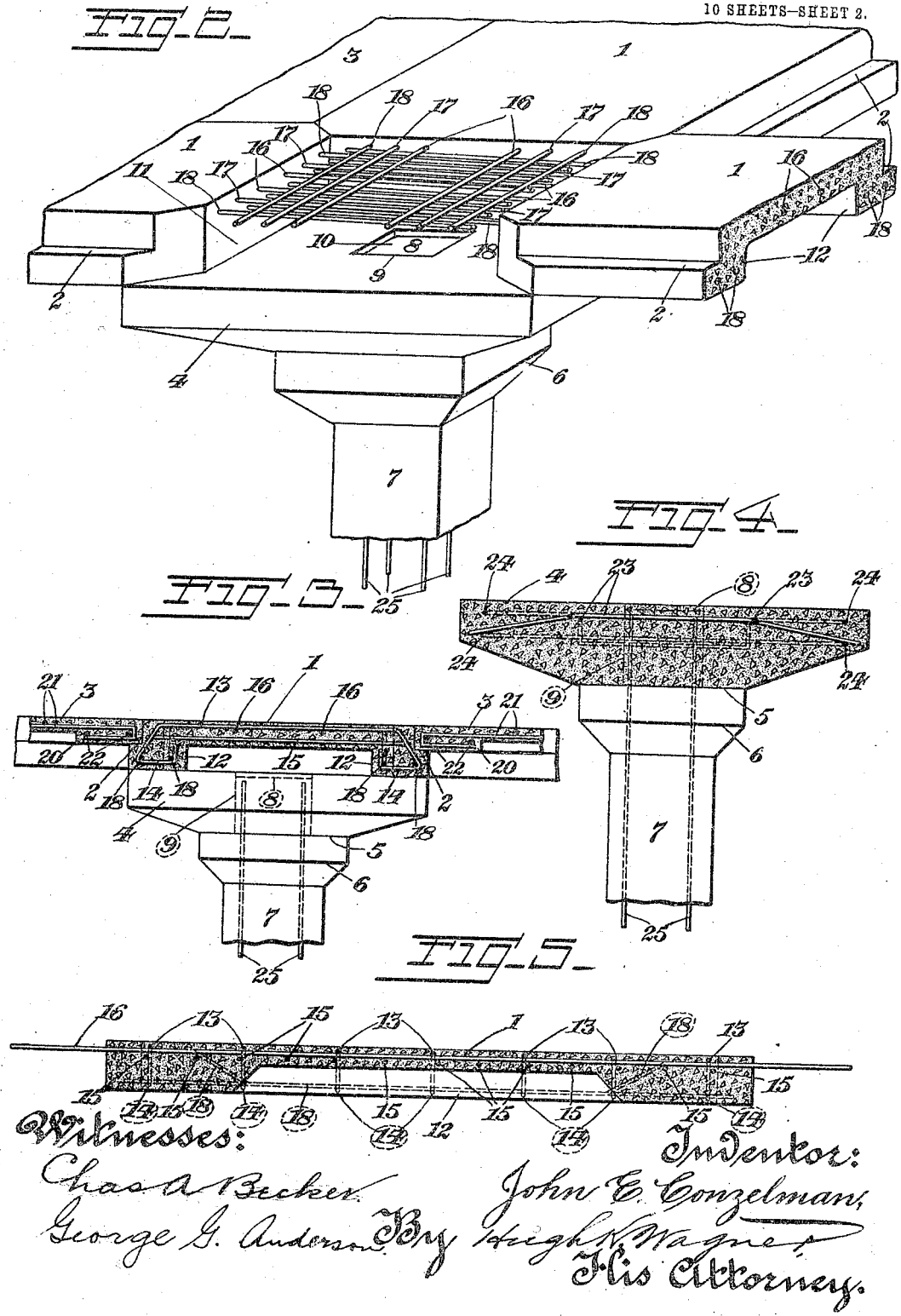

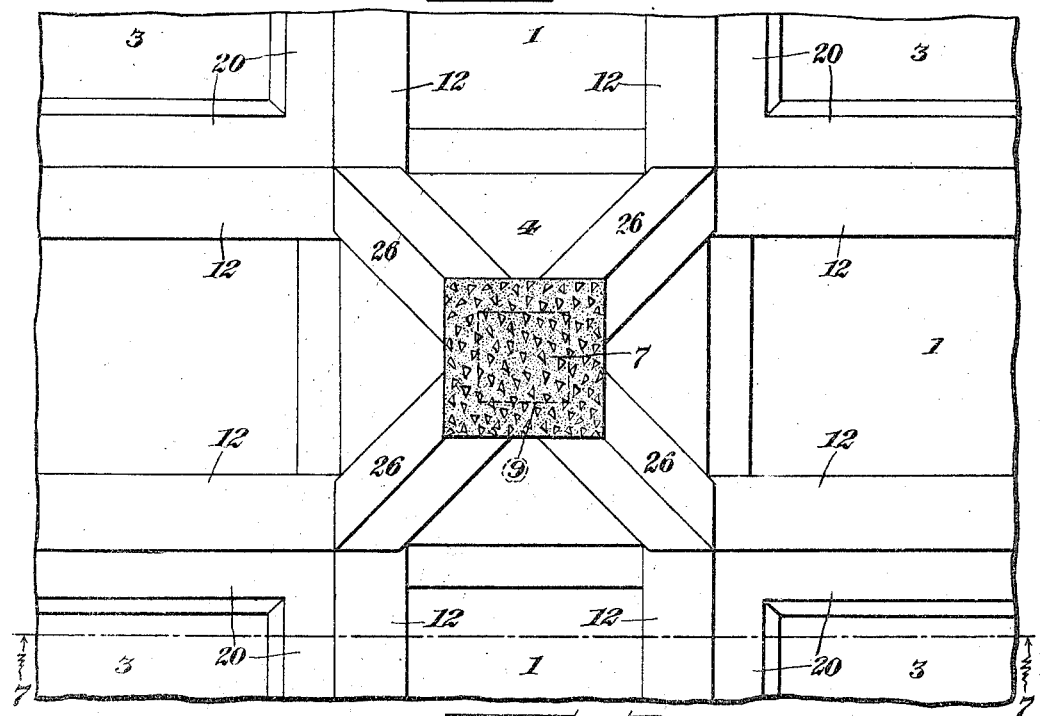
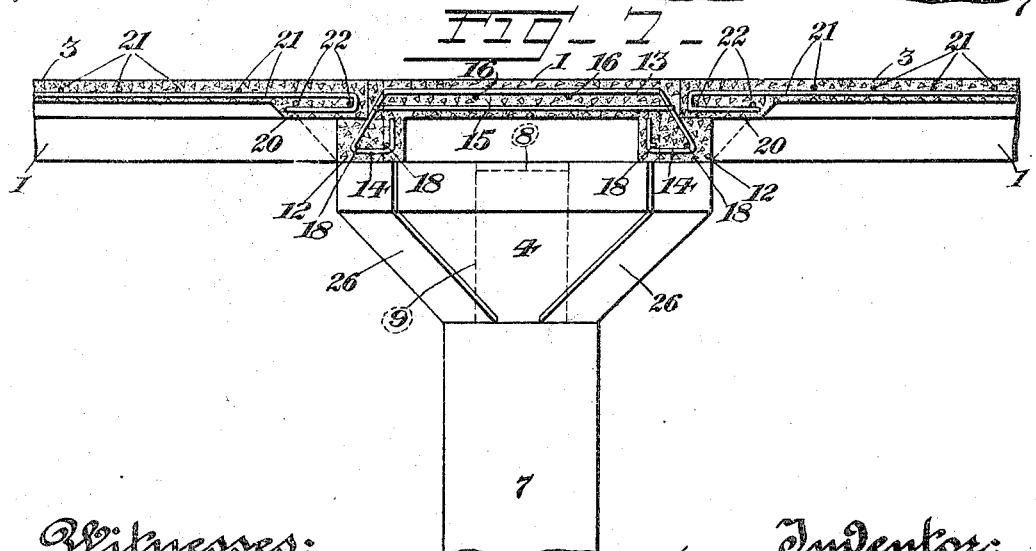

J. E. CONZELMAN.
CONCRETE CONSTRUCTION.
APPLICATION FILED APR. 14, 1910.
1,031,044.
Patented July 2, 1912.
10 SHEETS—SHEET 4.
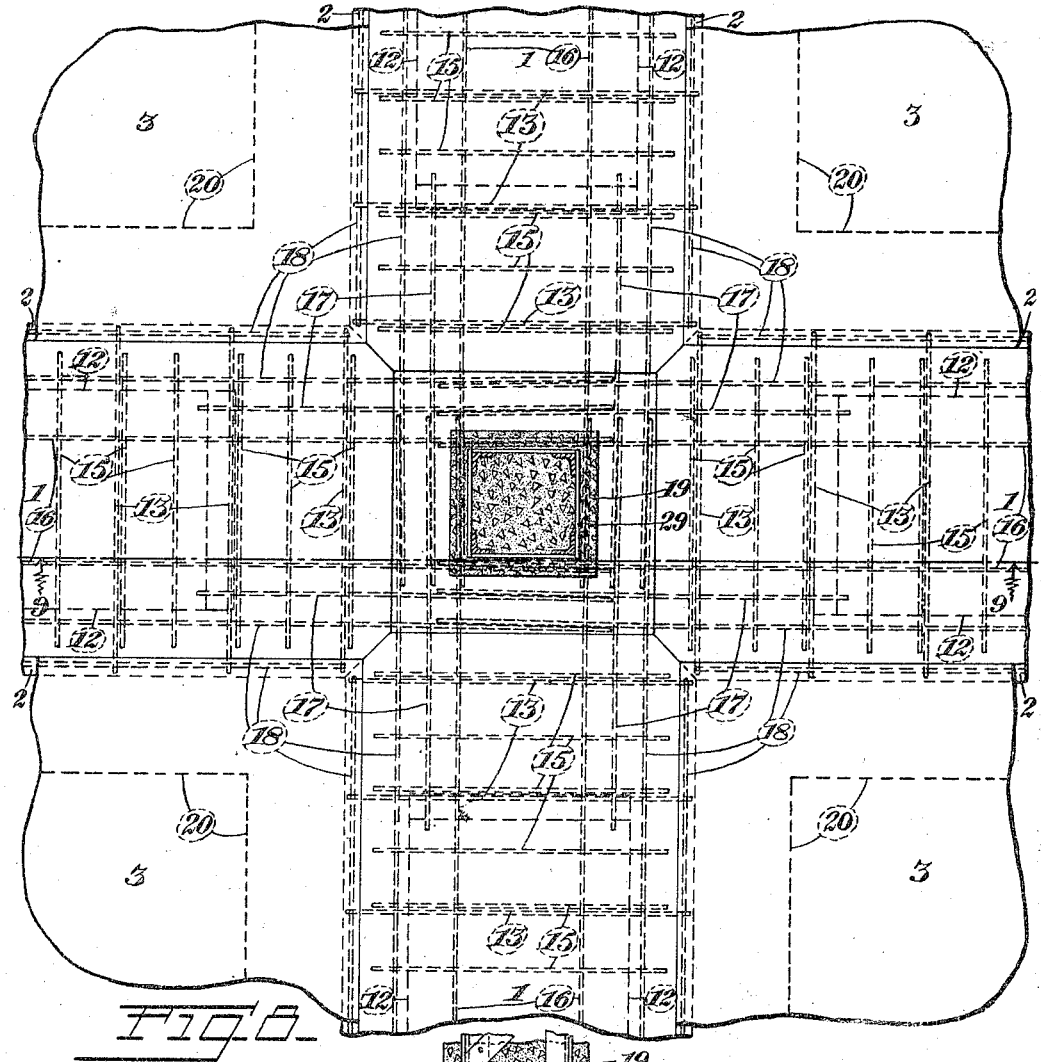
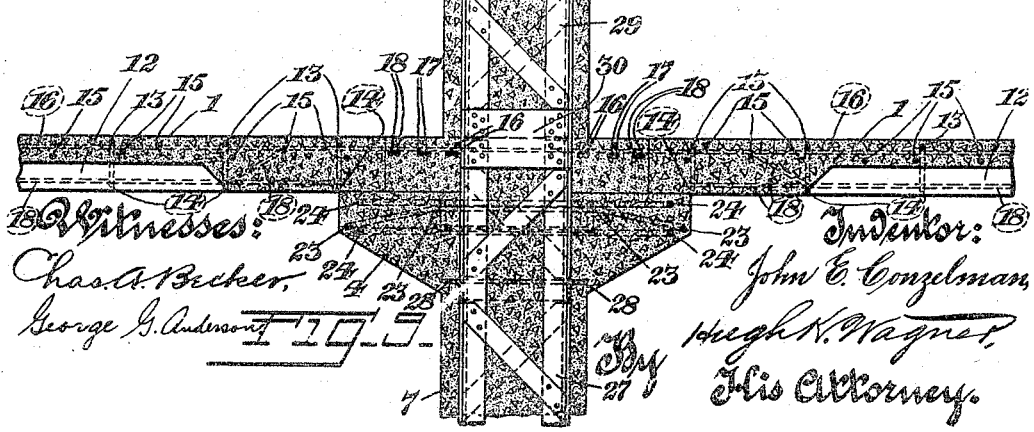

J. E. CONZELMAN.
CONCRETE CONSTRUCTION.
APPLICATION FILED APR. 14, 1910.
1,031,044.
Patented July 2, 1912
10 SHEETS—SHEET 5.
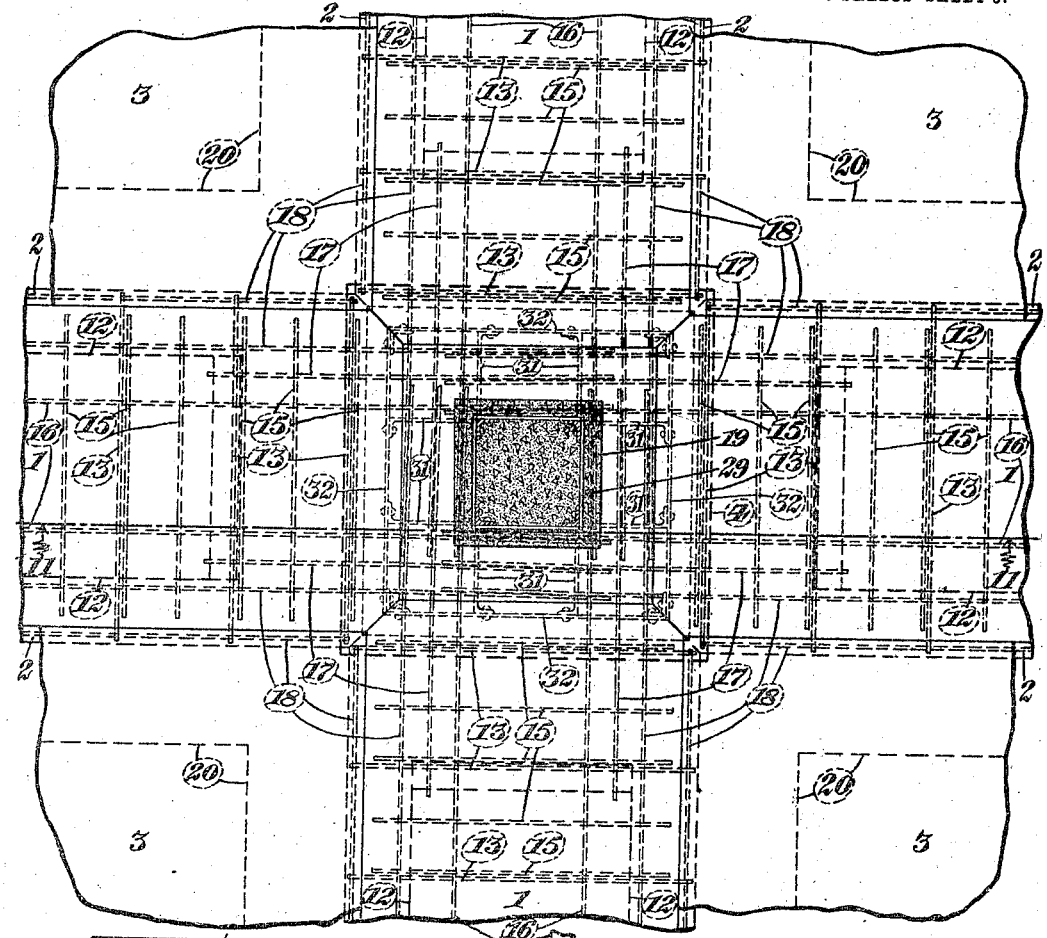
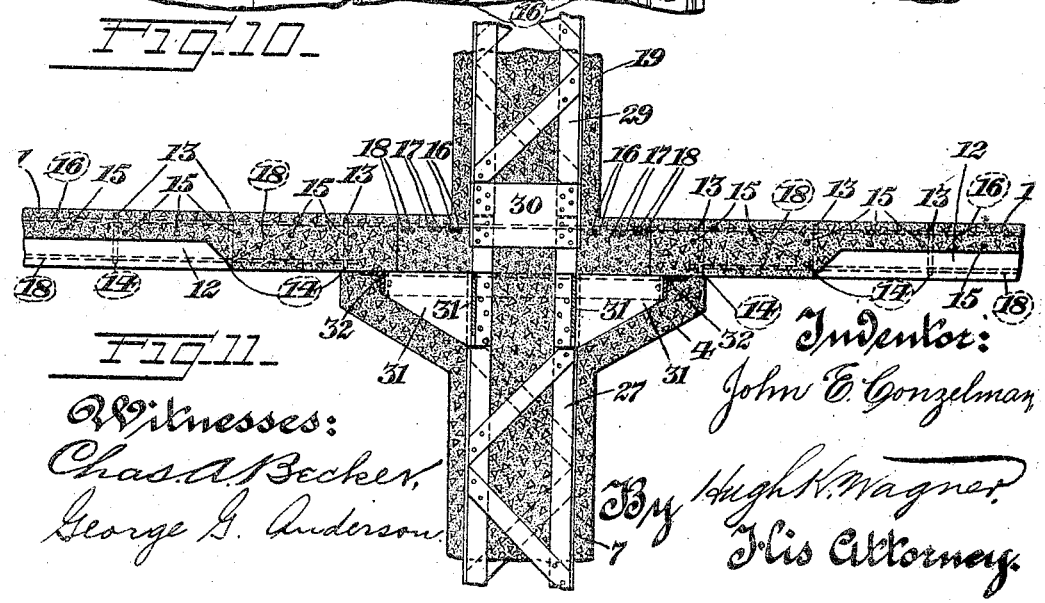
Witnesses:
Chas. A. Becker
George G. Anderson
Inventor:
John E. Conzelman
By Hugh K. Wagner
His Attorney

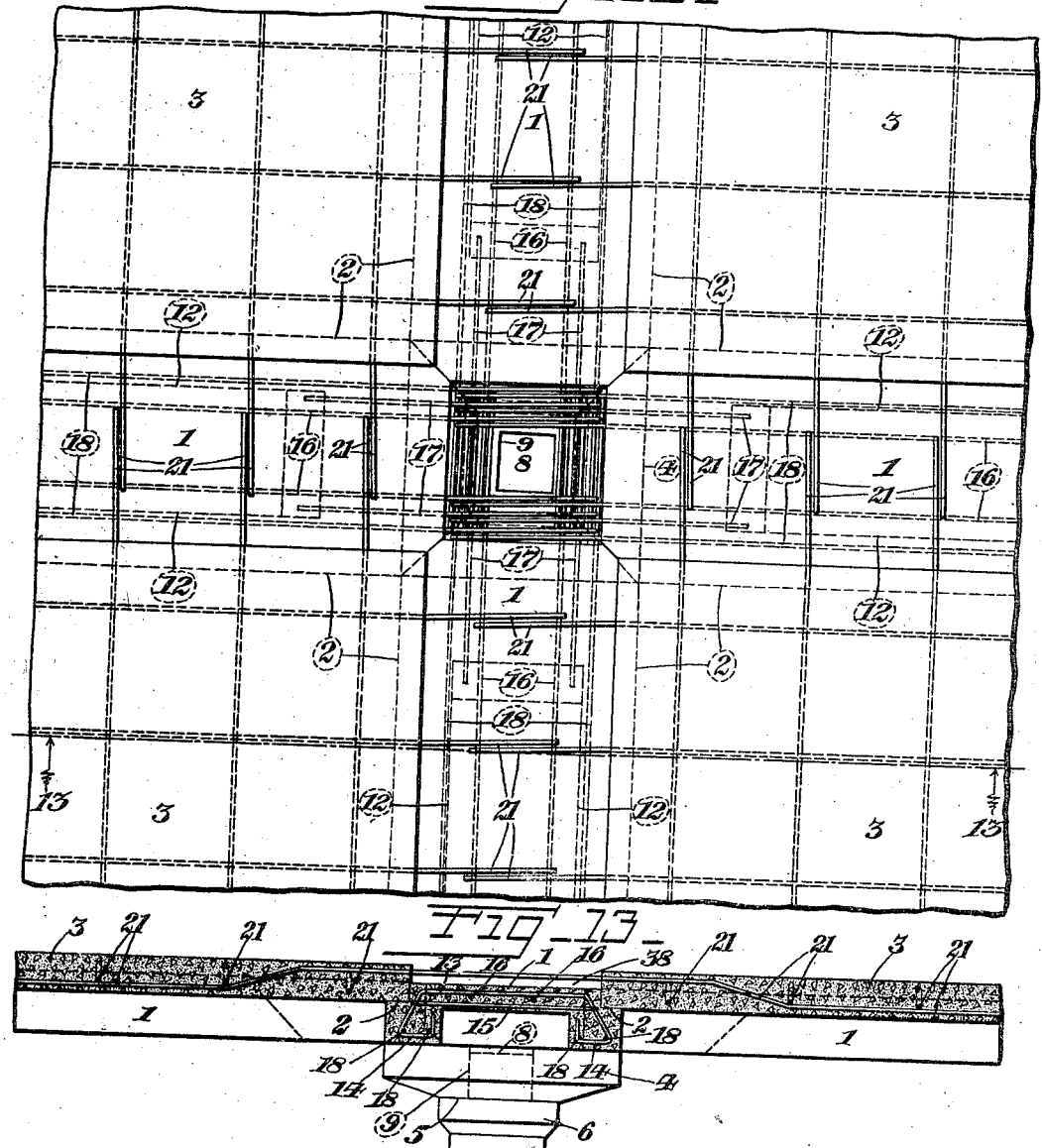

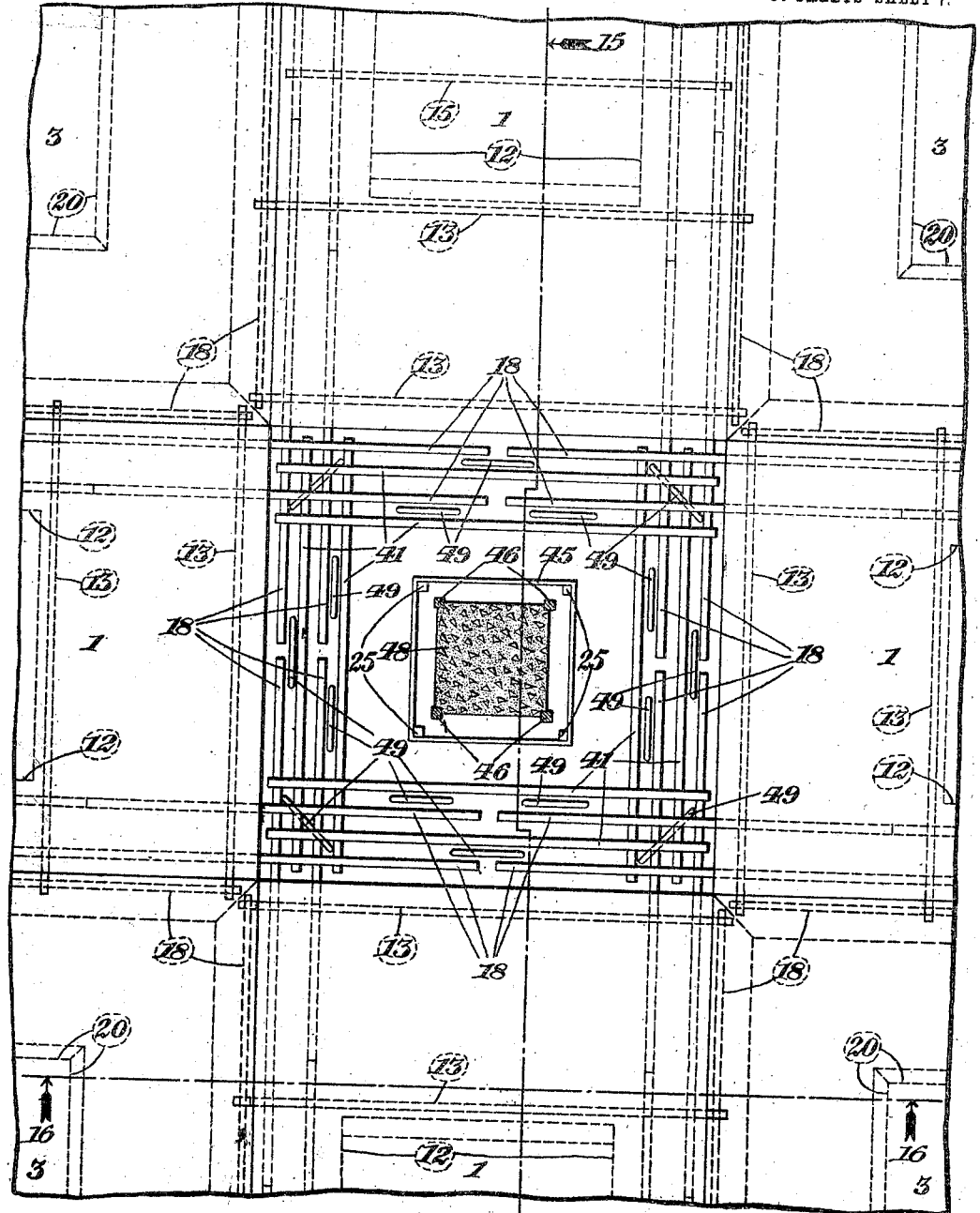

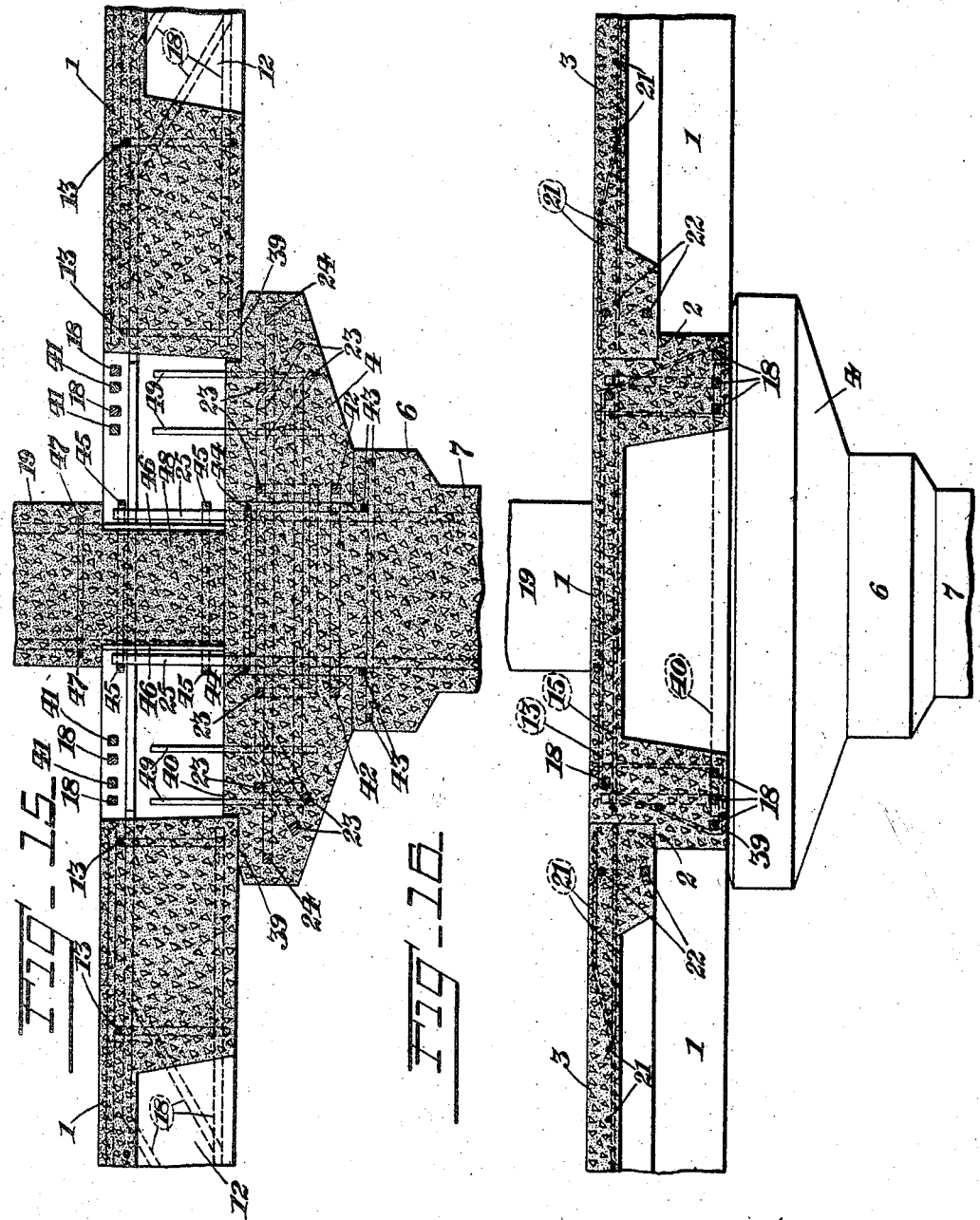

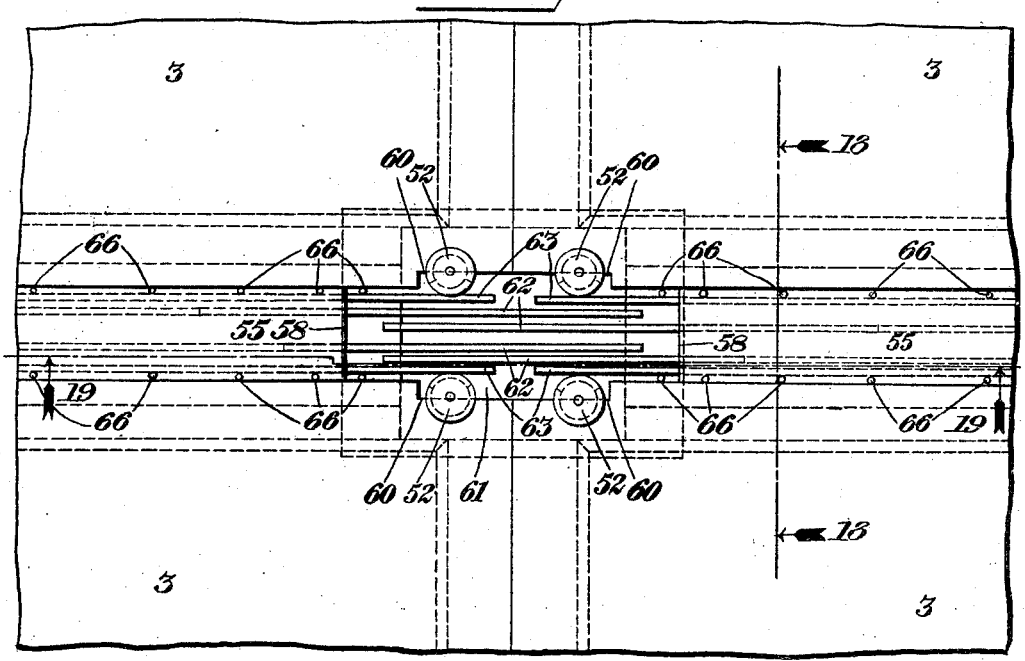
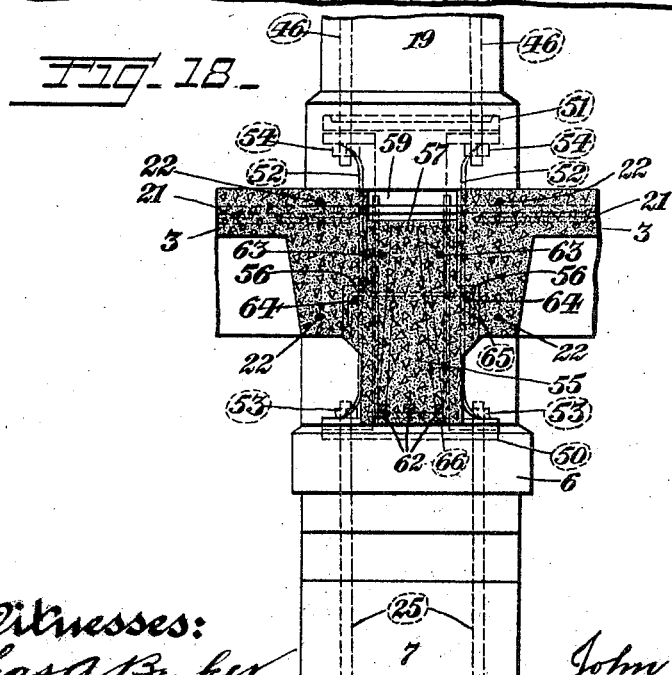

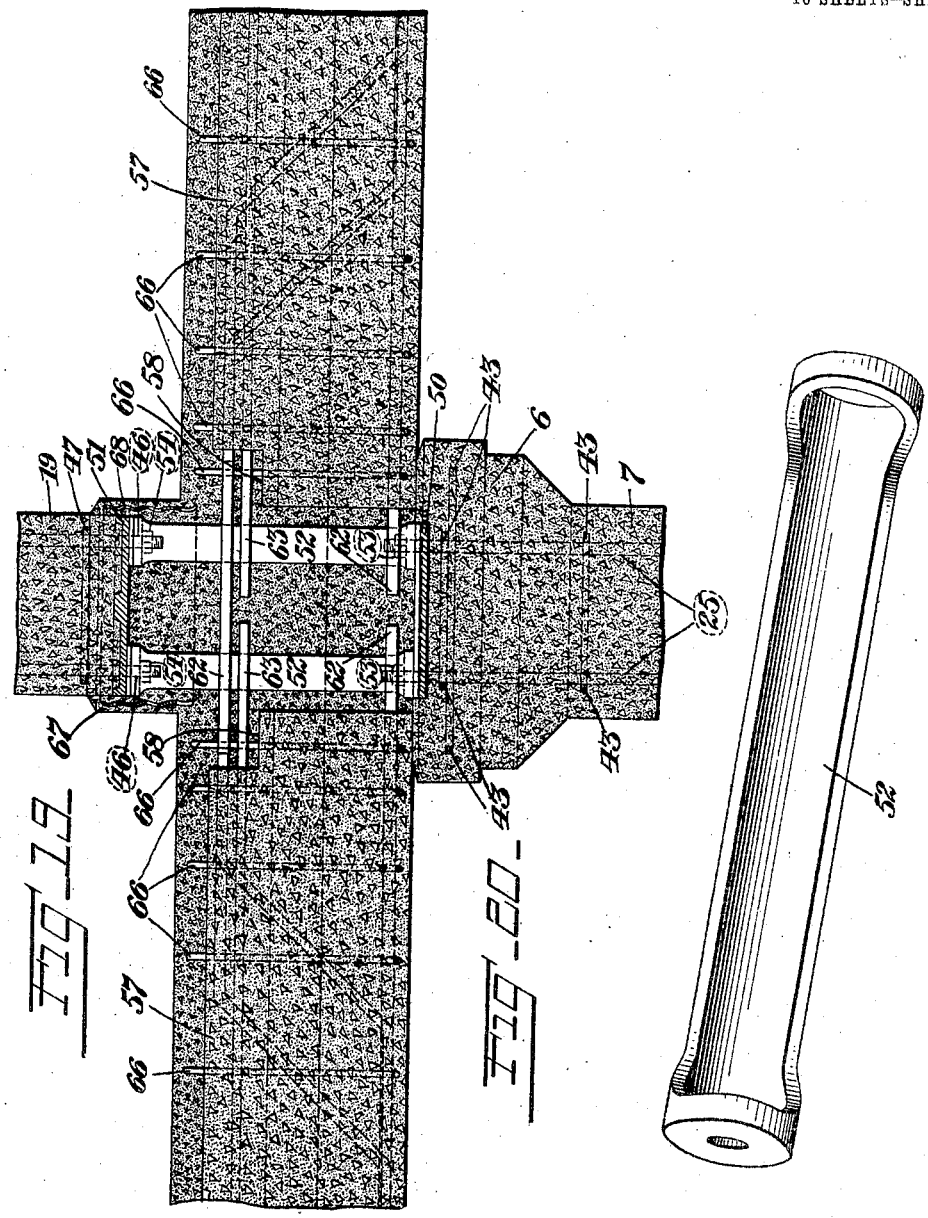

UNITED STATES PATENT OFFICE.

JOHN E. CONZELMAN, OF ST. LOUIS, MISSOURI, ASSIGNOR TO UNIT CONSTRUCTION COMPANY, OF ST. LOUIS, MISSOURI, A CORPORATION OF DELAWARE.

CONCRETE CONSTRUCTION.

1,031,044.

Specification of Letters Patent.    Patented July 2, 1912.

Application filed April 14, 1910.   Serial No. 555,354.

*To all whom it may concern:*

Be it known that I, JOHN E. CONZELMAN, a citizen of the United States, residing at the city of St. Louis, State of Missouri, have invented certain new and useful Improvements in Concrete Construction, (Case K,) of which the following is a specification, reference being had therein to the accompanying drawings.

This invention relates to concrete construction in which concrete girders are used to support concrete slabs and are themselves supported by means of columns or uprights.

It is an object of this invention to provide a rigid and unitary structure in which each concrete girder that is used is reinforced so that it can be formed comparatively wide and flat and, at the same time, be sufficiently strong to support a concrete slab or slabs adjacent to either side thereof and, also, to allow a part of same to be channeled, in order that the girder will have a section of the least possible area, thus attaining maximum economy by reason of the least possible material being used. By using a wide and flat girder comparatively little head room is taken up in the structure, and the channeled part of the girder gives a paneled effect to same.

Another object of this invention is to provide each supporting column or upright with means to support the wide girders which rest thereon so that a space is left between the ends of the girders that rest upon the supporting means in order to form a seat for the base of a superimposed column without the necessity of providing the ends of the girders with cut-away portions, as has been customary heretofore.

A further object of this invention is to provide means for connecting a supporting reinforced column with a superimposed reinforced column, so that continuity of the reinforcement is obtained between the columns.

In the drawings forming part of this specification, in which like numbers of reference denote like parts wherever they occur, Figure 1 is a top plan view showing a plurality of concrete girders resting upon a concrete column and supporting a plurality of concrete slabs; Fig. 2 is a perspective view of a concrete cap resting upon a concrete column and supporting a plurality of concrete girders; Fig. 3 is a sectional view on the line 3—3, Fig. 1; Fig. 4 is a sectional view of the concrete cap that supports the concrete girders; Fig. 5 is a longitudinal sectional view of a concrete girder; Fig. 6 is a bottom plan view showing an alternative form of concrete cap; Fig. 7 is a sectional view on the line 7—7, Fig. 6; Fig. 8 is a top plan view showing a concrete girder supported upon a steel column; Fig. 9 is a sectional view on the line 9—9, Fig. 8; Fig. 10 is a top plan view showing concrete girders supported upon a steel column; Fig. 11 is a sectional view on the line 11—11, Fig. 10; Fig. 12 is a top plan view of a plurality of concrete girders resting upon a concrete column and supporting a plurality of concrete slabs from which reinforcing bars protrude over said girders; Fig. 13 is a sectional view on the line 13—13, Fig. 12; Fig. 14 is a top plan view showing the base of a superimposed concrete column resting upon a supporting concrete column upon which a plurality of concrete girders rest that support a plurality of concrete slabs; Fig. 15 is a sectional view on the line 15—15, Fig. 14; Fig. 16 is a sectional view on the line 16—16, Fig. 14; Fig. 17 is a top plan view showing means for uniting a supporting concrete column to a superimposed column; Fig. 18 is a sectional view on the line 18—18, Fig. 17; Fig. 19 is a section view on the line 19—19, Fig. 17; and Fig. 20 is a perspective view, on an enlarged scale, of one of the connecting members shown in Figs. 17, 18, and 19.

Each girder 1 is preferably formed with a rectangular configuration, and is comparatively wide and thin. Each longitudinal edge of said girder is provided with a shoulder 2 which forms a rest for a slab or slabs 3 adjacent thereto. The longitudinal edges of the girders 1 and the edges of the slabs 3 may be rounded to prevent accidental nicking of same when said girders and slabs are being placed in their respective positions in the structure. The ends of said girder 1 rest upon a cap 4 that rests upon a shoulder 5 of a cap 6 of a supporting column 7. In order to prevent transverse motion or turning of cap 4 on cap 6, a stud 8, preferably angular, extends from cap 6 into part of a similarly shaped opening 9 in cap 4 so that a space 10 above said stud is left within said opening. Each corner of girder 1 is preferably beveled so that, when the ends of each girder are placed upon cap 4, each beveled corner fits against a similarly beveled corner of an adjoining girder. When the girders 1 are placed upon a cap 4 in the manner just described, a space 11, which is located above cap 4 and space 10, is left between the ends of said girders that rest upon said cap, and, grout or similar cement mixture or wet concrete is poured into spaces 10 and 11. The concrete or other mixture in space 11 is leveled off flush with the surface of girders 1, and, when it sets, unites girders 1, cap 4, and column 7 integrally together.

In order to form a girder having a section of maximum economy, i. e., a girder containing no excess of concrete, the middle portion of the under side of said girder is channeled between approximately the quarter points of the span of the girder so that each side of said girder is provided with a flange or rib 12 that extends between said quarter points. As additional strengthening means reinforcing bars 13 are embedded near the top surface of girder 1 and are spaced at intervals in same. Each bar 13 extends transversely of said girder and is bent downwardly at its ends to form stirrups 14 adjacent the sides of said girder, the purpose of each bar 13 being to stiffen the girder and to act as a narrow beam, thus preventing transverse bending of said girder when there is an excess of load on either side of same. Bars 15, also, extending transversely of girder 1, are spaced at intervals in said girder, but lie near the bottom surface of said girder in order to carry the load between the flanges 12. Bars 16 underlie bars 13 and extend longitudinally of girder 1, and, also, project from the ends of said girder. Short bars 17, which, also, underlie bars 13, extend from approximately the quarter points of the span and project from the ends of girders 1, said bars 17 being arranged to assist in taking up the tensile stress obviously existing in the top surface of the part of girder 1 that rests upon a cap 4. Bars 18 lie near the bottom surface of flanges 12 and extend through the stirrups 14. Adjacent the quarter points of the span some of the bars 18 bend upwardly and extend near the top surface of girder 1 and, also, project from the ends of said girder. The bars 16, 17, and 18 that project from an end of girder 1 extend into space 11 and preferably overlap similar bars 16, 17, and 18, respectively, projecting from an end of an oppositely-disposed girder. By reason of forming a wide girder 1 the space 11 is comparatively large, thereby allowing the base of a superimposed column 19 to be set in said space without the necessity of providing the ends of the girders with cut-away portions as has been customary heretofore, the bars 16, 17, and 18 being spaced so that an open space between the bars 16 is left in the center of space 11 for the placing of the base of column 19 therein.

The slab 3 may be either a flat slab or a slab with a flange or rib 20 that is provided on the under side thereof, said flange being the particular part of said slab that rests on shoulder 2 of girder 1. Said slab is preferably reinforced in both directions by means of bars 21 in order to distribute its load to the girders 1 supporting same, said bars being embedded near the bottom surface of said slab. Bars 22 are embedded in flange 20 and the ends of bars 21 are preferably bent to partly encircle same.

The cap 4 is formed with any desired configuration and, when it is desired, same can be molded integrally with column 7. Said cap is reinforced in both directions by means of bars 23 which are arranged to extend approximately at right angles to each other and are embedded near the surface of said cap. Each bar 23 is preferably bent into the form of a rectangle, the sides of the rectangle being located adjacent opposite sides of opening 9 in said cap, and the ends of the rectangle being bent downwardly to aid in carrying the stresses to which said cap 4 is subjected. Bars 24 are bent to extend near each side of cap 4 so that same act as binding rods for said cap. In order to strengthen stud 8 that projects into opening 9 in cap 4 reinforcing bars 25, which are embedded in column 19, extend into said stud. When it is desired cap 4 can be reinforced by means of projections or brackets 26, as depicted in Fig. 6, said brackets being preferably formed integrally with said cap in order to aid in carrying shearing stresses upon same.

In Figs. 8 to 11 inclusive this invention is used in connection with metal columns that are surrounded by concrete. The column 27 is set in place and a so-called form (not shown in the drawings) is placed around said column. Said form is filled with plastic concrete which sets therein and forms column 7 and cap 4 around column 27, said cap 4 being integral with column 7. The ends of each girder 1 are placed upon cap 4 and the slabs 3 are laid upon the shoulders 2 of the girders.

In Figs. 8 and 9, the column 27 is provided with a bracket or ledge 28 that is secured by any suitable means to said column and extends entirely around same to aid in supporting cap 4, the bars 23 and 24 being embedded in cap 4 in the manner hereinabove-described in order to strengthen same. Column 27 is preferably formed with such length that its top extends above cap 4 to allow a superimposed metal column 29 to be connected thereto by means of splice plates 30 or the like, the bars 16, 17 and 18 that project from the ends of each girder 1 into space 11 being arranged to extend adjacent the sides of column 27. A form is placed around column 29 and same and space 11 are filled with plastic concrete, which not only unites cap 4 and girders 1 integrally together, but forms a column 19 around column 29, said column 19 being integral with the concrete in space 11.

In Figs. 10 and 11, a structural steel cap is utilized to support the girders 1. Said steel cap preferably comprises the brackets 31 that are fastened by any suitable means to column 27 in order to support the angle-irons 32 which extend entirely around said column. The concrete column 7 and cap 4 are formed around the column 27 and the steel cap, respectively, in the manner hereinabove described. The ends of each girder 1 rest upon angle-irons 32 so that their load is distributed to the steel cap, and for this reason the bars 23 and 24 and bracket 28 is omitted entirely from cap 4.

In Figs. 12 and 13 each slab is formed with such thickness that, when same is placed upon a shoulder 2 of a girder 1, the surface of said slab occupies a position in a plane that is higher than the surface of said girder. When another slab is similarly placed upon the shoulder 2 on the opposite side of said girder a space 38 above said girder is left between the two slabs supported by same. Bars 21 in each slab 3 may project from the edges of said slab into space 38 and overlap the ends of similar bars 21 that project from the edges of a slab or slabs adjacent thereto. Space 38 is filled with grout or plastic concrete which runs into and fills spaces 10 and 11. The grout or plastic concrete in spaces 11 and 38 is leveled off flush with the surface of slabs 3, and, when it sets, unites slabs 3, girders 1, caps 4, and column 7 integrally together.

In Figs. 14, 15, and 16 the ends of each girder 1 rest on shoulder 39 of cap 4 and against stud 40 of such cap. Bars 18 project from the ends of each girder into space 11, but instead of the bars 18 that project from oppositely-disposed girders being arranged to overlap each other as in the previous figures, same are arranged to abut one another. In order to maintain continuity of the reinforcement between the ends of oppositely-disposed girders splice bars 41 are arranged in space 11 to overlap the ends of bars 18 that abut one another. The cap 4 is reinforced by means of bars 23 and 24 as hereinabove-described with the exception that a greater number of bars 23 and a less number of bars 24 are used and, also, that a bar 42 is embedded near the lower surface of said cap, said bar 42 being arranged to encircle opening 9 in said cap. Bars 43 are embedded in cap 6 of column 7 and are bent to surround bars 25 in said column, one bar 43 being located adjacent bars 25 and the other bar 43 being arranged near the perimeter of said cap. The stud 8 is preferably formed with a length that is substantially equal to the thickness of cap 4, and, when said cap is placed upon cap 6 of column 7, the stud 8 extends entirely through opening 9 so that the top of said stud registers in the plane of the surface of cap 4. A bar 44 is embedded in stud 8 and is arranged to encircle bars 25. Said bars 25 project from stud 8 into space 11, and are surrounded by means of a bar or bars 45. Bars 46 extend longitudinally in column 19, and are encircled with a bar or bars 47. The base portion of column 19 is provided with a stud 48 that rests upon the stud 8 so that bars 45 encircle said stud 48. Bars 46 are preferably arranged to project into space 11 and to extend along the edges of stud 48 so that same lap the bars 25 projecting from stud 8, and by this arrangement continuity of the reinforcement between columns 7 and 19 is obtained. U-shaped bars 49 having their ends embedded in cap 4 project into space 11. Said space 11 is filled with grout or plastic concrete which sets therein and unites girders 1, cap 4, and columns 7 and 19 integrally together.

In Figs. 17 to 19 inclusive means for connecting columns 7 and 19 is shown, same consisting of plates 50 and 51 and members 52 like the one depicted in Fig. 20, said plates 50 and 51 being set in the top of columns 7 and the bottom of column 19, respectively, and the members 52 being arranged to connect said plates. Bars 25 in column 7 extend through perforations in plate 50 and, also, through perforations in the lower ends of members 52. Said bars 25 are screw-threaded to receive nuts 53 that not only secure plates 50 to column 7 but, also, bind members 52 firmly to said plate. The upper ends of members 52 are similarly secured to plate 51 by means of nuts 54 on the screw-threaded bars 46 that extend through perforations in plate 51 and, also, in the upper ends of said members. The ends of each beam 55 rest upon cap 6 of column 7 and adjacent plate 51. Said beams 55 are oppositely-disposed in pairs so that members 52 are located between the ends of same that rest on cap 6, and are preferably formed with substantially the same shape in cross-sectional configuration as the beams disclosed in my copending application Serial No. 528,298, filed November 16, 1909. Each beam 55 is provided with the shoulders 56 and a tenon 57, a portion of the end of said tenon being cut away at 58. A flange 20 of each slab 3 rests on a shoulder 56 of a beam 55 and against tenon 57. Said flange 20 raises the top surface of slab 3 to a greater distance above shoulder 56 than the distance the tenon 57 projects above said shoulder, so that, when a slab is placed upon each shoulder 56 of a beam 55, a space 59 above tenon 57 is left between the two slabs supported by said beam. The corners of each slab 3 are located above cap 6 and are provided with cut-away portions 60 which unite to form space 61 through which members 52 extend, said space being located over cap 6 and partly with open sides, which must be temporarily closed with boards or formers.

Reinforcing bars 62 are embedded in the lower part of beam 55 and preferably project from the ends of same into space 61 in order to lap or abut similar bars 62 that project from an oppositely-disposed beam 55, some of said bars 62 being bent upwardly to project from the ends of tenon 57. Other reinforcing bars 63, which are embedded in tenon 57 project from same into space 61 and abut similar bars 63 that project from a tenon 57 of an oppositely-disposed beam 55. Bars 64 are embedded in shoulders 56 and are connected at intervals by the inverted U-shaped bars 65. U-shaped bars 66 are embedded at intervals in beam 55 so that their lower parts underlie bars 62. A so-called form (not shown in the drawings) is placed around the base of column 19 and said form and spaces 59 and 61 are filled with grout or plastic concrete. Said grout or plastic concrete sets in said form and spaces 59 and 61, being supported while plastic in said spaces by means of tenon 57 and cap 6 and the boards or formers, which close the sides of space 61, and unites slabs 3, beams 55, and columns 7 and 19 integrally together. The grout or concrete in the form encircling the base of column 19 forms a concrete ring 67 that is integral with column 19 and covers the upper end of each member 52. As additional strengthening means a ring of expanded metal 68 or the like is embedded in ring 67 and is preferably arranged to encircle the base of column 19 and, also, to extend into the grout or concrete in space 61.

I claim:

1. A concrete structure including a column, a stud projecting upwardly from the top of the column, a cap seating on the top of the column and having an opening into which said stud projects, a plurality of girders having their inner ends approximately in contact with each other and seating on the cap and being spaced from the cap opening to form a pocket in conjunction with the cap, which pocket surrounds the stud, and a concrete filler seating on the upper end of the stud and filling said pocket.

2. A concrete structure including a column, a stud projecting upwardly from the top of the column, a cap seating on the top of the column and having an opening into which said stud projects, a plurality of girders having their inner ends approximately in contact with each other and seating on the cap and being spaced from the cap opening to form a pocket in conjunction with the cap, which pocket surrounds the stud, reinforcing bars projecting from the said inner ends of the girders and extending into said pocket to overlie the upper end of the stud, and a concrete filler seating on the upper end of the stud and filling said pocket.

3. In a concrete structure, a column, oppositely disposed girders seating at one of their ends on said column and having said ends spaced from one another, an outwardly projecting flange on each side of each girder forming shoulders, slabs seating on said flanges and abutting the shoulders, and a concrete filler arranged in said space between the girders and seating on the top of the column, the corners of adjacent ends of the girders being beveled so that the adjoining beveled corners form a close union therebetween at points overlying the column top.

4. In combination with a column having a cap at its top, a stud extending upwardly from said cap, a second cap seating on said first cap and having an opening to receive said stud, said stud extending below the upper face of said second cap to form a grout-receiving pocket, two pairs of oppositely-disposed girders seating at their ends on the top of said second cap at points beyond said opening thereof to form in conjunction with the upper face of said second cap a second grout-receiving pocket which surrounds said first named pocket, and grout filling both of said pockets and extending flush with the top faces of the girders.

5. In combination with a column having a cap at its top, a stud extending upwardly from said cap, a second cap seating on said first cap and having an opening to receive said stud, said stud extending below the upper face of said second cap to form a grout-receiving pocket, two pairs of oppositely-disposed girders seating at their ends on the top of said second cap at points beyond said opening thereof to form in conjunction with the upper face of said second cap, a second grout-receiving pocket which surrounds said first named pocket, each of the girders having a series of reinforcing rods which project beyond the ends thereof and which form a horizontal layer of rods, the rods of the opposite pairs of said girders crossing each other and overlying said first pocket and being disposed at points intermediate the top and bottom of the second pocket, and grout filling both of said pockets.

In testimony whereof I have affixed my signature in presence of two witnesses.

JOHN E. CONZELMAN.

Witnesses:
GLADYS WALTON,
HUGH K. WAGNER.

Copies of this patent may be obtained for five cents each, by addressing the "Commissioner of Patents, Washington, D. C."